(12) United States Patent
Broisin

(10) Patent No.: US 8,496,252 B2
(45) Date of Patent: Jul. 30, 2013

(54) SEAL

(75) Inventor: Denis Broisin, Fortschwihr (FR)

(73) Assignee: Carl Freudenberg KG, Weinheim (DE)

( * ) Notice: Subject to any disclaimer, the term of this patent is extended or adjusted under 35 U.S.C. 154(b) by 218 days.

(21) Appl. No.: 12/691,144

(22) Filed: Jan. 21, 2010

(65) Prior Publication Data
US 2010/0181732 A1 Jul. 22, 2010

(30) Foreign Application Priority Data

Jan. 21, 2009 (EP) .................................. 09000774

(51) Int. Cl.
F16J 15/32 (2006.01)
(52) U.S. Cl.
USPC .......................................... 277/559; 277/549
(58) Field of Classification Search
USPC ........................... 277/549, 559, 560, 561, 562
See application file for complete search history.

(56) References Cited

U.S. PATENT DOCUMENTS

| 4,426,094 | A |  | 1/1984 | Antonini |  |
| 5,015,608 | A |  | 5/1991 | Matsuhisa et al. |  |
| 6,520,507 | B2 | * | 2/2003 | Pataille et al. | 277/561 |
| 6,676,132 | B1 | * | 1/2004 | Takebayashi et al. | 277/560 |
| 6,764,080 | B2 | * | 7/2004 | Hosokawa et al. | 277/564 |
| 6,945,537 | B2 |  | 9/2005 | Guillerme et al. |  |
| 7,823,886 | B2 |  | 11/2010 | Warnecke et al. |  |
| 8,011,673 | B2 | * | 9/2011 | Berdichevsky | 277/553 |
| 2005/0285350 | A1 |  | 12/2005 | Oricchio, Jr. |  |
| 2008/0136111 | A1 |  | 6/2008 | Uhrner et al. |  |
| 2009/0166977 | A1 |  | 7/2009 | Lutaud et al. |  |

FOREIGN PATENT DOCUMENTS

| DE | 10352674 A1 | 6/2005 |
| DE | 102006059398 A1 | 6/2008 |
| EP | 1024318 A2 | 8/2000 |
| EP | 1462686 A1 | 9/2004 |
| JP | 60084479 A | 5/1985 |
| JP | 63166763 A | 7/1988 |
| RU | 74679 U1 | 7/2008 |
| WO | 2008/009317 A1 | 1/2008 |
| WO | 2008009317 A1 | 1/2008 |

OTHER PUBLICATIONS

European Search Report for EP09000774 dated Jun. 17, 2009.

* cited by examiner

Primary Examiner — Gilbert Lee
(74) Attorney, Agent, or Firm — Leydig, Voit & Mayer, Ltd.

(57) ABSTRACT

A seal includes a supporting body; a disk-shaped sealing element fixed to the supporting body so as to form a static seal and to include a free end; and a sealing body disposed at the free end so as to form a dynamic sealing edge, wherein the sealing body includes a material that is a different from a material of the sealing element.

8 Claims, 5 Drawing Sheets

SEAL

Priority is claimed to European Patent No. EP 09 000 774.1, filed Jan. 21, 2009, the entire disclosure of which is incorporated by reference herein.

The invention relates to a seal, comprising a supporting body to which a disc-shaped sealing element is fixed, wherein the sealing element is fixed to the supporting body in such a way that it forms a static seal and comprises a free end.

BACKGROUND

Such a seal is known from international application WO 2008/009317 A1. The previously known seal comprises an L-shaped supporting ring, to which a disc-shaped sealing element of PTFE is fixed, wherein the sealing element is fixed to the supporting ring in such a way that it surrounds the supporting ring at an end face and on the outside forms a static seal and on the inside comprises a projecting free end which forms the dynamic seal. The free end of the sealing element lies adjacent to the material to be sealed with radial pretensioning on account of the restoring force of the PTFE material.

Radial shaft sealing rings, which are used for machine elements for areas of use at low temperatures, i.e. temperatures which lie well below freezing point, are equipped with sealing lips made from an elastomer suitable for low-temperature applications. Temperatures of use which lie below the glass transition temperature of the elastomer used lead to embrittlement of the material and thus to an insufficient sealing effect of the sealing lip. Special fluorinated rubbers, for example, are an elastomer material group known for low temperatures of use. These special fluorinated rubbers admittedly have a lower glass transition temperature than usual fluorinated rubbers, but they are much more expensive.

SUMMARY OF THE INVENTION

An aspect of the present invention is to develop further the previously described radial shaft sealing ring for low-temperature applications, in such a way that the latter can be produced more cost-effectively.

In an embodiment, a sealing body from which a dynamic sealing edge is formed is disposed at the free end, the sealing body being made from a material differing from the sealing element. The sealing element is fixed to the supporting body in such a way that its projects from the supporting body on the inside and forms a free end. This free end is mobile, so that the sealing body is fixed to the sealing element in a spring-mounted manner. It is particularly advantageous here that the sealing body has a comparatively small volume, so that the material requirement for the sealing body is low. The material costs can thus be reduced, especially if the specifications require that the dynamically-sealing sealing body lying adjacent to the machine element to be sealed is made from an elastomer with high procurement costs.

The sealing element can be made from PTFE. PTFE can be used in a large temperature range. It has a glass transition temperature of approximately 70° C. This means that the material becomes brittle only below this temperature. Generally, however, PTFE exhibits worse elastic properties compared to elastomer sealing materials, such as fluorinated rubbers (FKM, FPM, FFKM). It is not able therefore to function as a dynamic sealing lip in all cases. In these cases, in which more elastic properties of the sealing lip are required, provision is made according to the invention to provide the free end of the sealing element formed from PTFE with a sealing body made of an elastomer material. A further advantage of PTFE is its high chemical resistance.

The sealing body can be made from a fluorinated rubber. Fluorinated rubbers are elastomers which have a high chemical resistance and a large spectrum of temperature applications. Furthermore, fluorinated rubbers display advantageous ageing properties. Special fluorinated rubber compounds display a particularly advantageous low-temperature resistance. Seals made of such compounds can be used down to −40° C. Such compounds, however, are very expensive, so that the inventive effect emerges particularly advantageously with these compounds.

At the outer periphery, the sealing body can have a recess in which a spring body is disposed. A sealing element of PTFE, a washer, which has been produced from a tubular semi-finished product, already exerts a restoring force by itself, which leads to pressing of the sealing body in a radial direction against the machine element to be sealed. At low temperatures, and depending on guidance accuracy of the shaft, this restoring force could be not sufficient, so that the necessary contact pressure of the sealing body cannot be guaranteed solely by the sealing element. The spring body, for example an annular helical spring, increases the contact pressure of the sealing body and also maintains the latter at low temperatures.

The sealing element can be provided with a coating at least on one side. The sealing element is thus protected against attack by aggressive media according to the provision of the coating on one side or on both sides.

The sealing body and the coating can be designed made of the same material and in one piece. The binding area between sealing element and coating is thereby increased, so that the binding between sealing element and sealing body is improved with a minimally increased material requirement.

The sealing element can cover an end face of the supporting body. As a result, the supporting body is protected against attack by aggressive media. A separate treatment of the supporting body, for example a coating, can be dispensed with. It may however be advisable to pre-treat the supporting body, for example by means of a plasma treatment, in order to improve the binding between sealing element and supporting body.

The sealing body can be provided with a dust lip. The dust lip protects the actual dynamic sealing lip against coarser contamination.

The supporting body can be designed L-shaped. Such supporting bodies can be produced particularly easily by stamping or also free from clippings from sheet metal strips.

BRIEF DESCRIPTION OF THE DRAWINGS

Several examples of embodiment of the seal according to the invention are explained in greater detail below with the aid of the figures. In the figures, in each case schematically.

DETAILED DESCRIPTION

Figure 1:
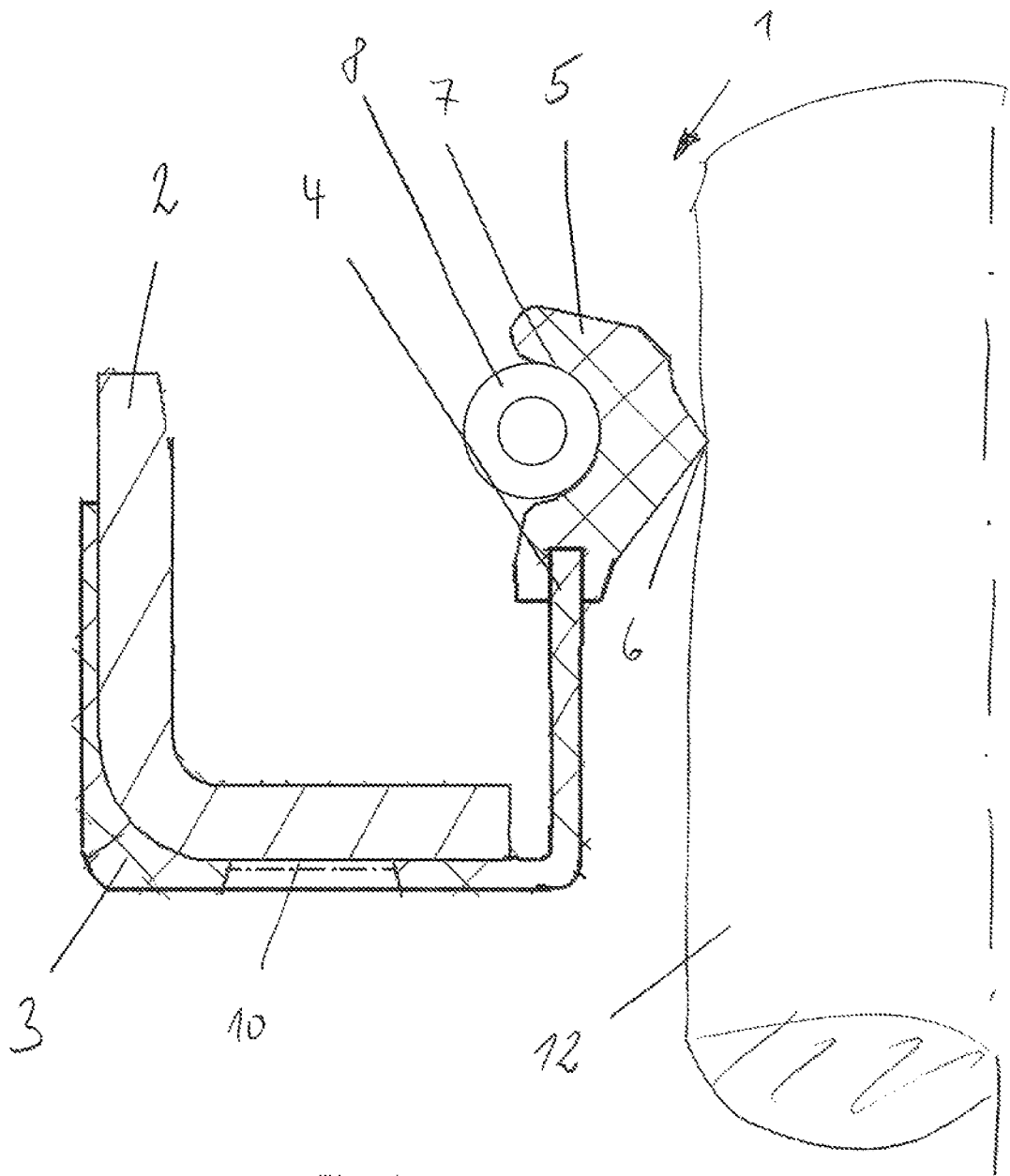
FIG. 1 shows a seal whose sealing body is provided with a spring body.

The figures show a seal 1 with advantageous cold-running properties for low-temperature applications down to −40° C.

Seal 1 comprises an L-shaped supporting body 2, formed as a metal stamping, to which a disc-shaped sealing element 3 of PTFE is fixed. Sealing element 3 surrounds an end face 10 of supporting body 2 and surrounds end face 10 in such a way that on the outside it forms a static seal and on the inside comprises a free end 4 which projects from the supporting body. An annular sealing body 5 is disposed on free end 4 in a firmly bonded manner and mobile in the radial direction, a dynamic sealing edge 6 being formed from said sealing body. Sealing body 5 is formed from a fluorinated rubber compound (FKM, FPM, FFKM) and is thus made from a material differing from sealing element 3. Sealing body 5 lies adjacent to machine element 12 to be sealed in a sealing manner with elastic pretensioning due to the restoring force of sealing element 3 formed from PTFE.

FIG. 1 shows a seal 1, sealing body 5 whereof comprises a recess 7 at the outer periphery in which a spring body 8, an annular helical spring made of metallic material, is disposed, which increases the contact pressure of sealing body 5 on machine element 12 to be sealed and also maintains the latter at low temperatures.

Figure 2:
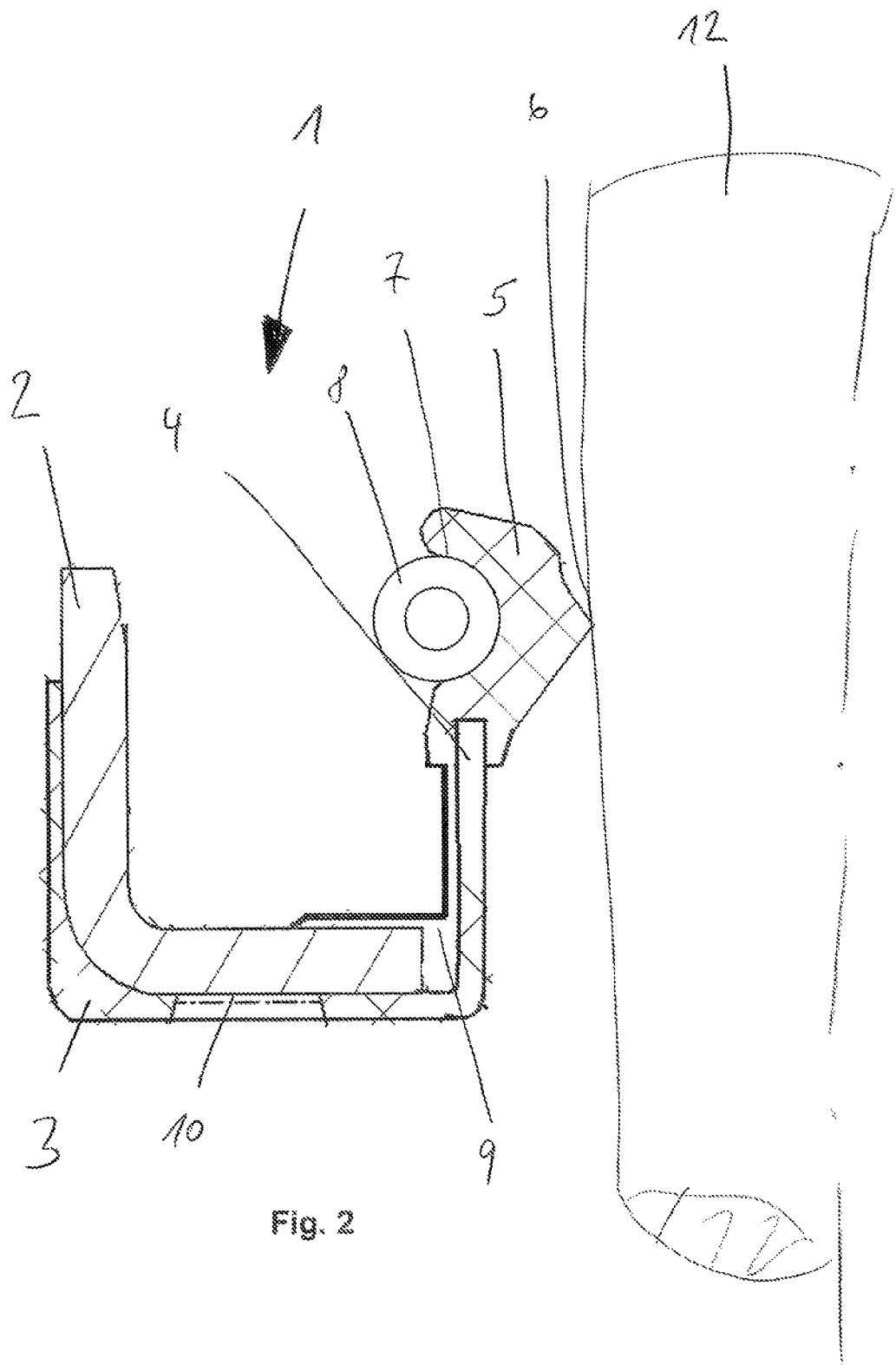
FIG. 2 shows a seal whose sealing element is provided on one side with a coating.

FIG. 2 shows a seal 1, sealing body 5 whereof comprises a recess 7 at the outer periphery in which a spring body 8, an annular helical spring made of metallic material, is disposed, which increases the contact pressure of sealing body 5 on machine element 12 to be sealed and also maintains the latter at low temperatures. In addition, sealing element 3 is provided with a coating 9 on one side, on the side facing the medium to be sealed. Coating 9 is formed from the same material and in one piece with sealing body 5.

Figure 3:
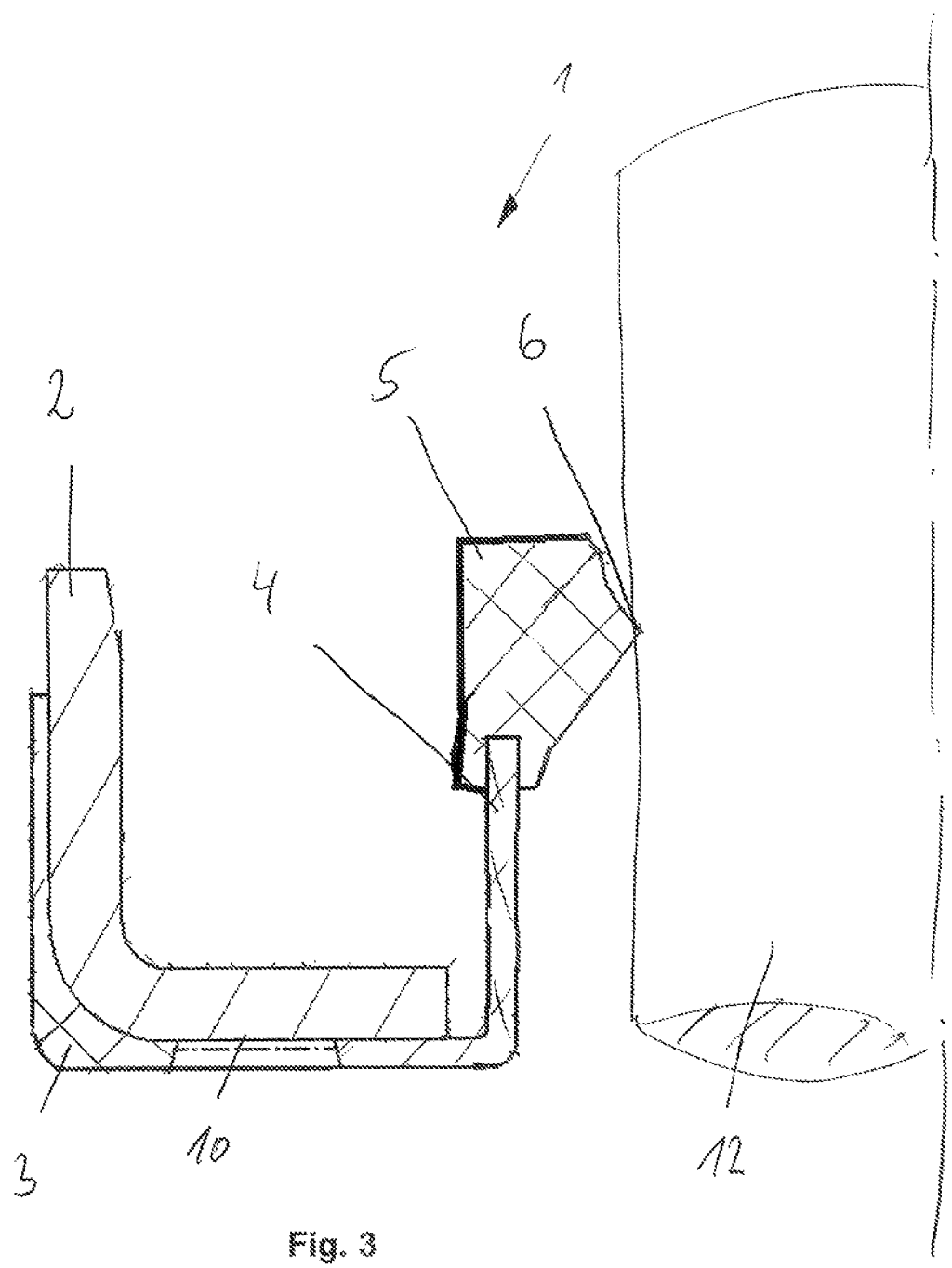
FIG. 3 shows a seal without a spring body.

FIG. 3 shows a seal 1, wherein sealing element 3 and free end 4 belonging to sealing element 3 are designed in such a way that the radial pressing of sealing body 5 on the machine element to be sealed is sufficient and an additional spring body is not required.

Figure 4:
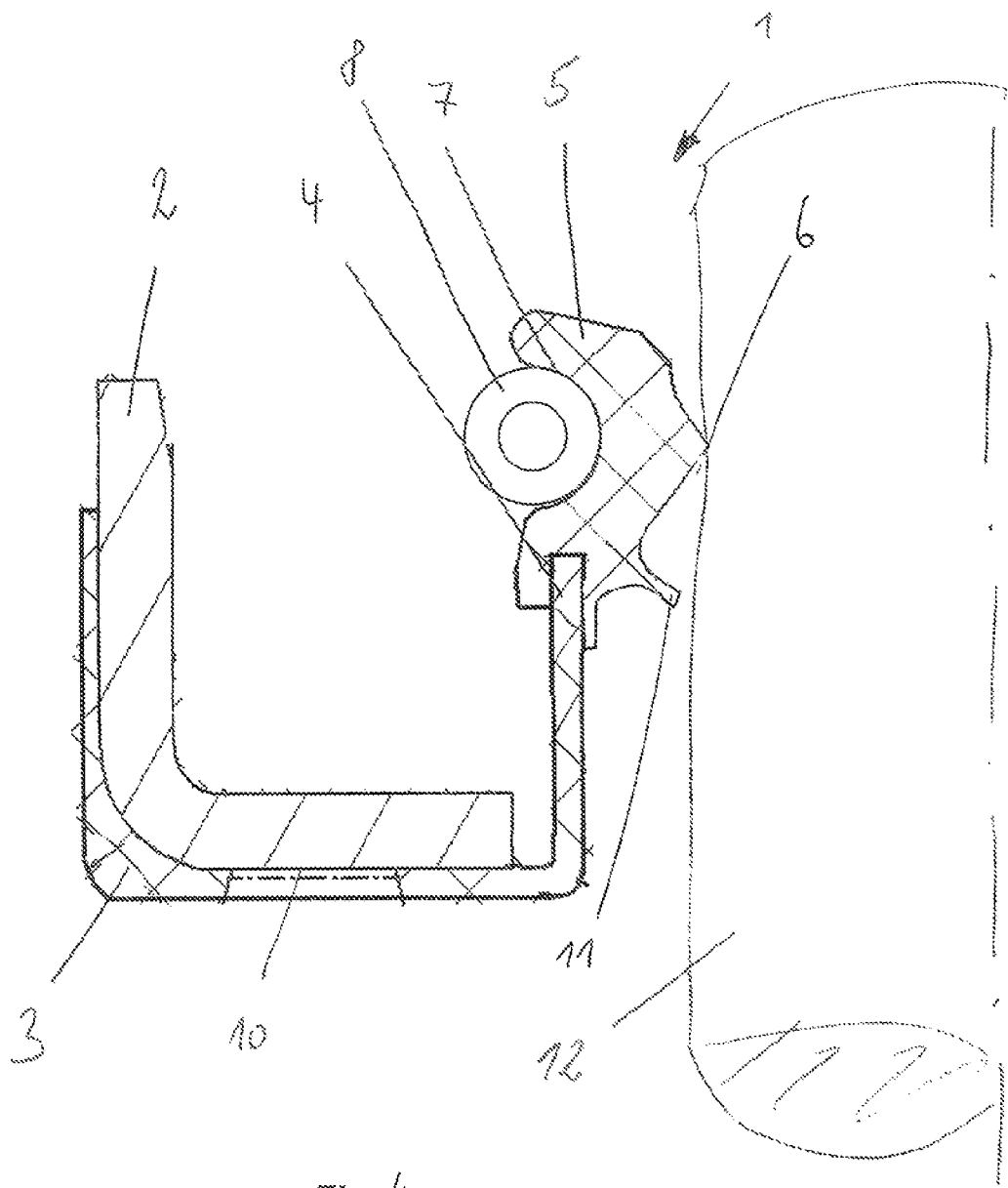
FIG. 4 shows a seal whose sealing body comprises a dust lip.

FIG. 4 shows a seal according to FIG. 1, wherein sealing body 5 in this embodiment is additionally provided with a dust lip 11.

Figure 5:
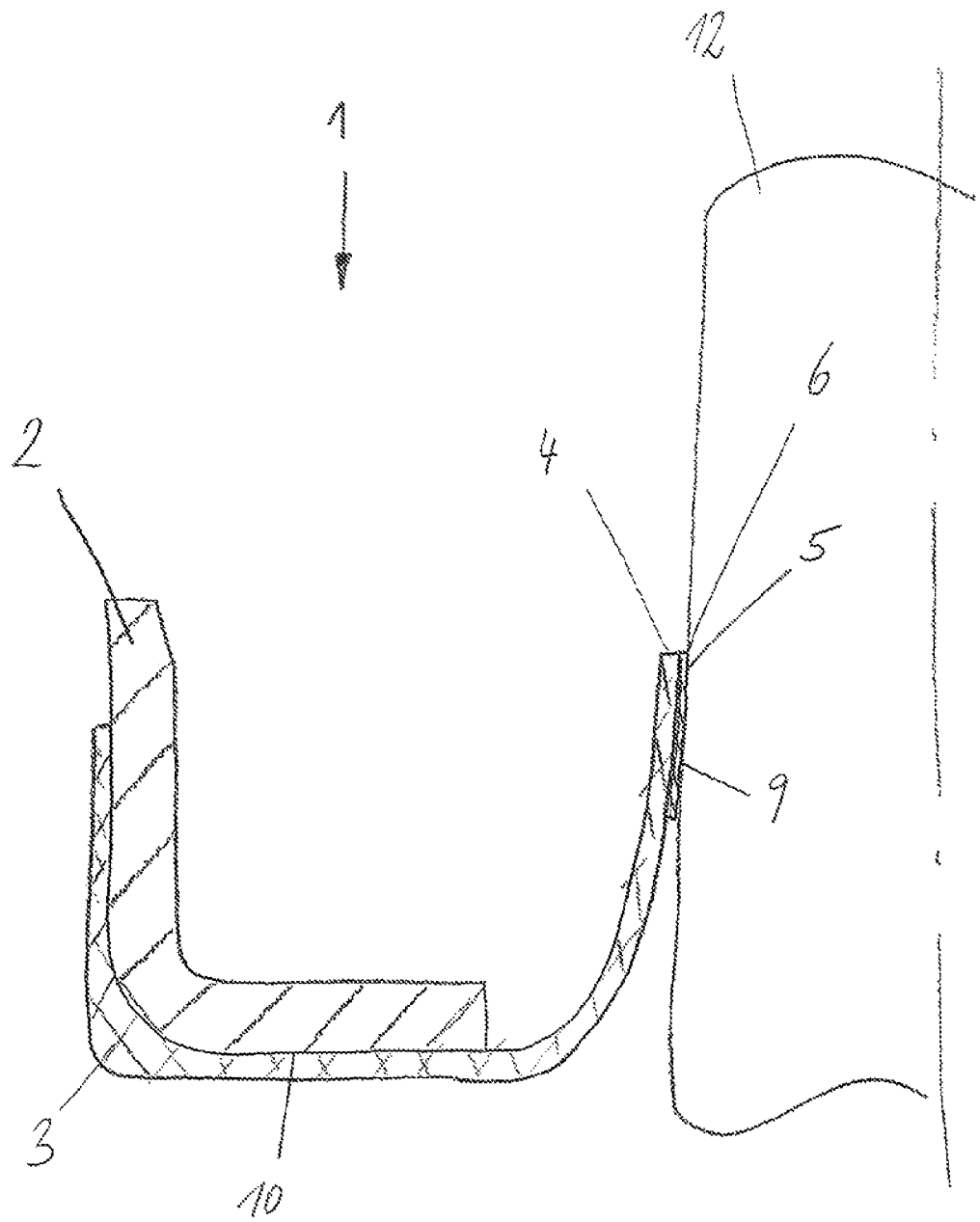
FIG. 5 shows a seal with a thin elastic coating on the PTFE lip.

FIG. 5 shows a seal 1, wherein the sealing element 3 is provided with a coating 9 made of an elastomeric material on its free end 4, especially made of a fluorinated rubber compound. The coating 9 forms the sealing body 5. The advantage of this embodiment is the minimal material requirement of the elastomeric material.

What is claimed is:

1. A seal having a radial outside configured to form a static seal with a surrounding element and a radial inside configured to form a dynamic sealing edge on a machine element, the seal comprising:
    a supporting body;
    a disk-shaped sealing element composed of PTFE that is fixed to and in contact with the supporting body so as to form the static seal at the radial outside of the seal, the sealing element having a free end; and
    a sealing body composed of fluorinated rubber that is disposed at the free end of the disk-shaped sealing element so as to form the dynamic sealing edge at the radial inside of the seal.

2. The seal as recited in claim 1, further comprising a spring body disposed in a recess formed at an outer periphery of the sealing body.

3. The seal as recited in claim 1, wherein the sealing element includes a coating disposed on at least one side of the sealing element.

4. The seal as recited in claim 3, wherein the sealing body and the coating are formed in one piece from the same material.

5. The seal as recited in claim 1, wherein the sealing element is configured to cover an end face of the supporting body.

6. The seal as recited in claim 1, wherein the sealing body includes a dust lip.

7. The seal as recited in claim 1, wherein the supporting body is L-shaped.

8. The seal as recited in claim 1, wherein the sealing body is formed from the coating.

* * * * *